United States Patent
Heinze et al.

(10) Patent No.: US 6,797,898 B2
(45) Date of Patent: Sep. 28, 2004

(54) SWITCHING DEVICE

(75) Inventors: Ralf Heinze, Lüdenscheid (DE); Klaus Hirschfeld, Lüdenscheid (DE); Diethelm Ladwig, Breckerfeld (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 10/753,650

(22) Filed: Jan. 8, 2004

(65) Prior Publication Data
US 2004/0144630 A1 Jul. 29, 2004

Related U.S. Application Data

(63) Continuation of application No. PCT/EP02/10869, filed on Sep. 27, 2002.

(30) Foreign Application Priority Data

| Oct. 1, 2001 | (DE) | 101 48 554 |
| Dec. 11, 2001 | (DE) | 101 60 801 |

(51) Int. Cl.$^7$ ............................................. H01H 9/00
(52) U.S. Cl. ................... 200/61.27; 200/61.54; 200/553; 200/547; 200/332; 200/339
(58) Field of Search .................... 200/4, 6 A, 17 R, 200/18, 553, 556–558, 332, 335, 339, 61.27, 61.54, 551, 547–549

(56) References Cited

U.S. PATENT DOCUMENTS

| 5,045,648 | A | * | 9/1991 | Fogleman, Sr. | ............ | 200/43.16 |
| 5,068,633 | A | * | 11/1991 | Maeda | ............ | 335/190 |
| 5,735,392 | A | * | 4/1998 | Shirasaka | ............ | 200/553 |
| 6,114,640 | A | * | 9/2000 | Oddo et al. | ............ | 200/61.27 |
| 6,172,311 | B1 | * | 1/2001 | Hayashi | ............ | 200/61.27 |
| 6,388,221 | B1 | * | 5/2002 | Rudolph et al. | ............ | 200/556 |

FOREIGN PATENT DOCUMENTS

| DE | 38 39 911 C | 2/1990 |
| DE | 195 40 039 A | 4/1997 |
| EP | 0 255 418 A | 2/1988 |

* cited by examiner

Primary Examiner—Michael A. Friedhofer
(74) Attorney, Agent, or Firm—Brooks Kushman P.C.

(57) ABSTRACT

A switching device having a housing, an indexing bolt, a spring, and guiding ribs. The bolt is mounted in a longitudinal direction in a guide channel of the housing to move axially through the guide channel. The bolt has a tip at a front end. The spring is connected between the housing and a rear end of the bolt to axially bias the bolt tip against a switch plate. The ribs are distributed along the periphery of the front end of the bolt. The ribs radially project outward from the bolt to abut the surface of the guide channel such that the ribs are radially biased against the surface of the guide channel. The ribs are distributed along the periphery of the front end of the bolt in the longitudinal direction. The ribs guide the front end of the bolt as the bolt moves axially through the guide channel.

18 Claims, 3 Drawing Sheets

SWITCHING DEVICE

CROSS-REFERENCE TO RELATED APPLICATIONS

This is a continuation of International Application PCT/EP02/10869, published in German, with an international filing date of Sep. 27, 2002, which claims priority to DE 101 48 554.9 filed on Oct. 1, 2001 and DE 101 60 801.2 filed on Dec. 11, 2001.

BACKGROUND OF THE INVENTION

1. Field of the Invention

The present invention relates to a switching device having an indexing bolt and a latching spring in which the indexing bolt is movably mounted in the direction of its longitudinal extension in an indexing bolt housing and in which the latching spring retains and axially biases the indexing bolt against a switch plate.

2. Background Art

Arrangements having an indexing bolt movably mounted in the direction of its longitudinal extension in an indexing bolt housing are used to display switching points in electrical switching devices. The indexing bolt itself is guided and held against a switch plate in such a switching device. The indexing bolt retained against the switch plate is spring loaded. To this end, a spring element is arranged between the indexing bolt and the indexing bolt housing. Typically, an indexing bolt is a cylindrical shaft having a conically tapered free end which forms a tip for engaging the switch plate. The indexing bolt housing is designed based upon the cylindrical shape of the indexing bolt shaft and generally has a cylindrical guide channel.

To ensure that the indexing bolt can be smoothly guided against the switch plate and that the switching position can be fixed in specific switching points near the switch plate, it is important that the indexing bolt is able to move in a longitudinal axial direction the channel of the indexing bolt housing even when transverse forces are acting on the indexing bolt during an activation of the switching device. However, this can only be accomplished by mounting the indexing bolt in the indexing bolt housing with the most optimal play possible.

If the play between the indexing bolt and the indexing bolt housing is too low, there is a risk that the indexing bolt will become jammed in the indexing bolt housing. If the play between the indexing bolt and indexing bolt housing is too high, the problem of the indexing bolt becoming jammed in the indexing bolt housing is at least largely prevented, but a switching device equipped with such an arrangement exhibits a level of play upon activation of the switching device that sometimes precludes a reliable switching. In general, it is undesirable to use switching devices whose operating lever (i.e., indexing bolt) has excessive play to ensure that the switching device is functional while switching.

To avoid these disadvantages, indexing bolts have been developed that carry a Teflon® ring for guiding the indexing bolt in the indexing bolt housing in the area of a thickened cylindrical material in order to reduce friction, and hence forestall jamming. The indexing bolt itself is made out of metal so that a moisture-induced swelling otherwise encountered with plastic cannot take place. However, such an indexing bolt is difficult to manufacture because the interacting components are only to have minimal tolerances. In unfavorable cases, the indexing bolt is rigidly guided in the indexing bolt housing. This could be countered through the use of springs with a correspondingly strong design.

SUMMARY OF THE INVENTION

Proceeding from this described background art, an object of the present invention is therefore to further develop the switching device of the described background art in such a way that the indexing bolt can be guided in the indexing bolt housing without jamming and with the least possible play using means that are easy to manufacture.

This object is achieved according to the present invention in that the indexing bolt of the switching device has several guiding means distributed along its periphery. The guiding means project outwardly from the indexing bolt and abut the surface of the guide channel of the indexing bolt housing in a radially biased manner.

In a first embodiment of the switching device in accordance with the present invention, the guiding means are formed by flexible guiding ribs that are arranged in the longitudinal direction of the indexing bolt. The guiding ribs guide the front area of the indexing bolt near its tip in the indexing bolt housing. The guiding ribs are preferentially spaced apart at the same angular distance relative to one another and abut the inner surface of the indexing bolt housing in order to guide the indexing bolt along the guide channel of the indexing bolt housing. The guiding ribs have a relatively small contact region which contacts the inner surface of the indexing bolt housing formed by the guide channel. Each guiding rib preferentially contacts the adjacent inner surface of the indexing bolt housing only along a respective contact line. The guiding ribs have flexible characteristics, and to some extent elastic characteristics, which result from the flexibility and elasticity characteristics of the material used to form the guiding ribs.

The guiding area near the tip of the indexing bolt exiting the indexing bolt housing is configured to guide the indexing bolt in the indexing bolt housing without play. Providing flexible guiding ribs that abut the inside of the indexing bolt housing ensures that at least this guiding section of the indexing bolt is guided without play.

In order to manufacture the indexing bolt, which is preferentially provided as a single piece, the guiding ribs can be oversized somewhat relative to the inside diameter of the guide channel located in the indexing bolt housing owing to their flexible characteristics. In cases where the indexing bolt is made out of a plastic material, e.g., in an injection molding process, the guiding ribs initially inserted in the indexing bolt housing under a certain level of bias can relax after some time, thereby equalizing a somewhat tighter initial fit after several activations of the indexing bolt. The plastic material has specific elastic characteristics in addition to the flexible characteristics of the guiding ribs fabricated from the plastic material. This ensures that the guiding ribs abut the inner surface of the indexing bolt housing formed by the guide channel at all times under a low level of bias.

In a second embodiment of the switching device in accordance with the present invention, the guiding means are movable pressure arms designed as levers. Each pressure arm has a deflecting element that interacts with the latching spring in such a way as to press the respective pressure arm in a radial direction against the inner surface of the indexing bolt housing. As a result, the indexing bolt includes an integrated, spring-loaded spreading mechanism. The spreading mechanism is designed to radially press the elastic pressure arms located in the area near the tip of the indexing bolt against the inner wall of the indexing bolt housing in response to the elastic force exerted by the latching spring. An advantage of the second embodiment is that the pressure force exerted by the pressure arms is always at least approximately proportional to the elastic force exerted by the latching spring. As such, the pressure force can be adjusted in a controlled and calculated manner via the structural design of the pressure arms and/or the selection of a suitable latching spring.

Both embodiments of the present invention provide that the guiding means are arranged in a first guiding section located near the shaft tip (i.e., bolt tip), and that another guiding section is situated at the end of the indexing bolt lying opposite the shaft tip. The indexing bolt is then guided in the indexing bolt housing via these two guiding sections. The second guiding section is preferably designed in such a way that the guiding means of the second guiding section exhibit a bead. The bead is preferentially rounded. In cases where the guiding means are to be somewhat elastic this end of the indexing bolt can be slotted with the slot intersecting the bead. Regardless of how the guiding means are designed in the rear guiding section, the elastic characteristics of the guiding means arranged in the area of the indexing bolt tip effectively prevent the indexing bolt from becoming jammed in the indexing bolt housing.

BRIEF DESCRIPTION OF THE DRAWINGS

The present invention will be described below based on the two exemplary embodiments with reference to the following figures.

DETAILED DESCRIPTION OF THE PREFERRED EMBODIMENT(S)

Figure 1:
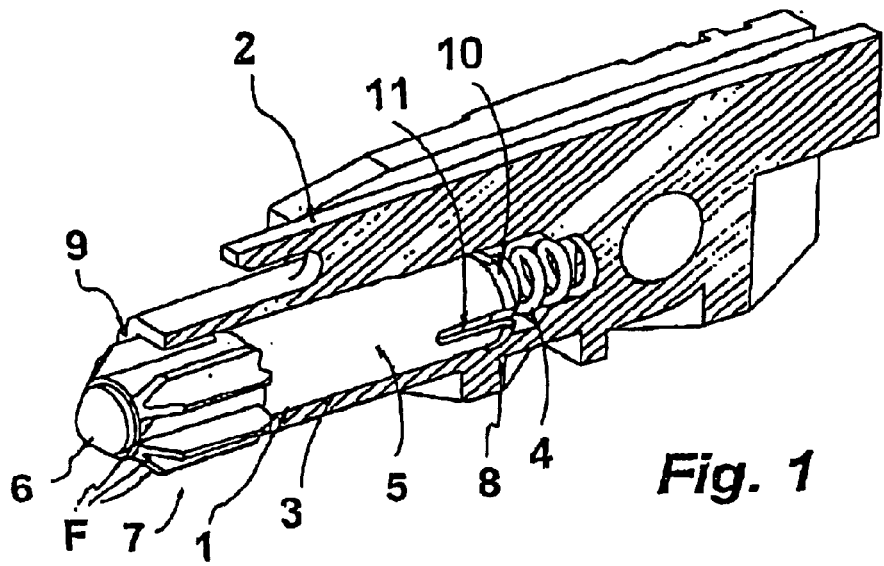
FIG. 1 illustrates a cut-away sectional view of an indexing bolt guided in an indexing bolt housing in accordance with the first embodiment of the present invention.

Referring now to FIG. 1, an indexing bolt 1 is guided in an indexing bolt housing 2 in a longitudinally movable manner. To this end, indexing bolt housing 2 has a guide channel 3 in which indexing bolt 1 is movably mounted. Indexing bolt 1 abuts the foot of guide channel 3 of indexing bolt housing 2 via a latching spring 4. Indexing bolt 1 includes a cylindrical shaft 5 which is hollow and has a cavity for accommodating compression spring 4. Shaft 5 has a free end projecting from indexing sleeve housing 2. The free end of indexing bolt 1 is conically tapered to form a tip 6. Tip 6 of indexing bolt 1 engages the switch plate of an electrical switch (not shown).

Guiding means 6 allocated to indexing bolt 1 guide the indexing bolt. Guiding means 7 are arranged in the area of shaft 5 at the section adjacent to tip 6. The end of indexing bolt 1 remote from tip 6 is provided with another guiding section 8 formed by a rotating bead 10. Guiding means 7 include guiding ribs F which project outwardly from shaft 5. Adjacent pairs of guiding ribs F form a V-shaped design to form a guiding rib pair in the area of their base. Indexing bolt 1 and guiding ribs F are made of plastic using an injection molding process. In this case, use is made of a plastic that imparts flexibility, and to some extent elasticity, characteristics to guiding ribs F.

Figure 2:
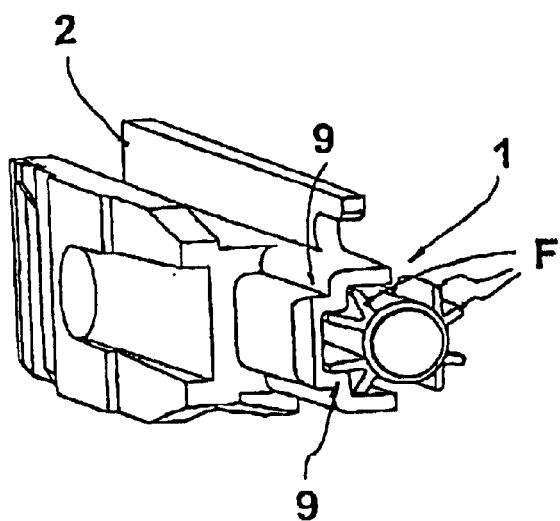
FIG. 2 illustrates the arrangement shown in FIG. 1 viewed toward the indexing bolt tip.
Figure 3:
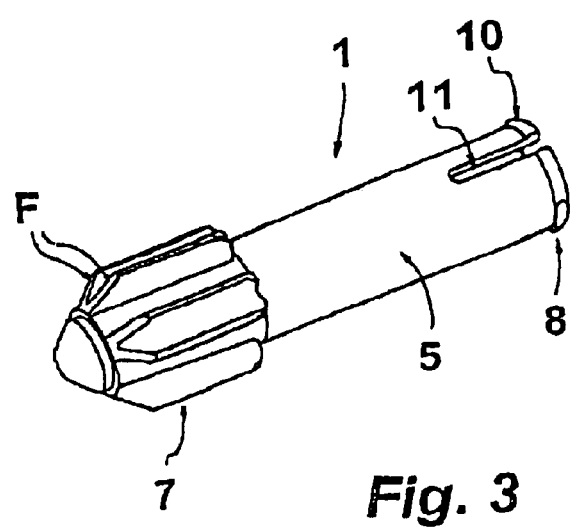
FIG. 3 illustrates a perspective view of the indexing bolt shown in FIGS. 1 and 2.

Each guiding rib pair surrounds a respective projection 9 of indexing bolt housing 2. Projections 9 of indexing bolt housing 2 extend into guide channel 3 as can be discerned from FIG. 2. The two guiding ribs F of each guiding rib pair outwardly abut the wall sections of indexing bolt housing 2 that form projections 9. Guiding ribs F of a guiding rib pair are fabricated with a V-shaped design, whose aperture angle is slightly smaller than the angular distance required for abutting against the respective wall sections of indexing bolt housing 2 that form respective projection 9. For this reason, guiding ribs F of guiding rib pairs abut these wall sections of indexing bolt housing 2 under a certain level of bias. The rounded ends and angular arrangement of guiding ribs F relative to the wall sections forming projections 9 ensure that guiding ribs F each contact these wall sections only along a line. Not only does this measure minimize friction, but having two guiding ribs F of respective guiding rib pairs surround respective projections 9 also secures indexing bolt 1 against twisting in guide channel 3 of indexing bolt housing 2.

The rear guiding section 8 of indexing bolt 1 is formed by a rotating bead 10. Rotating bead 10 is arranged at the rear end of shaft 5 and has an outwardly rounded surface. Shaft 5 is slotted in the area of its rear section by a slot 11. The outside diameter of bead 10 is preferentially slightly oversized relative to the inside diameter of guide channel 3 of indexing bolt housing 2 in this section. Incorporating slot 11 makes the rear section flexible, and imbued by the material with certain elastic characteristics. Because of its rounded exterior, the outside of bead 10 therefore lies along a line on the inside of guide channel 3 exposed to a certain level of bias. Indexing bolt 1 is hence guided without play in guide channel 3 of indexing bolt housing 2.

Figure 4:
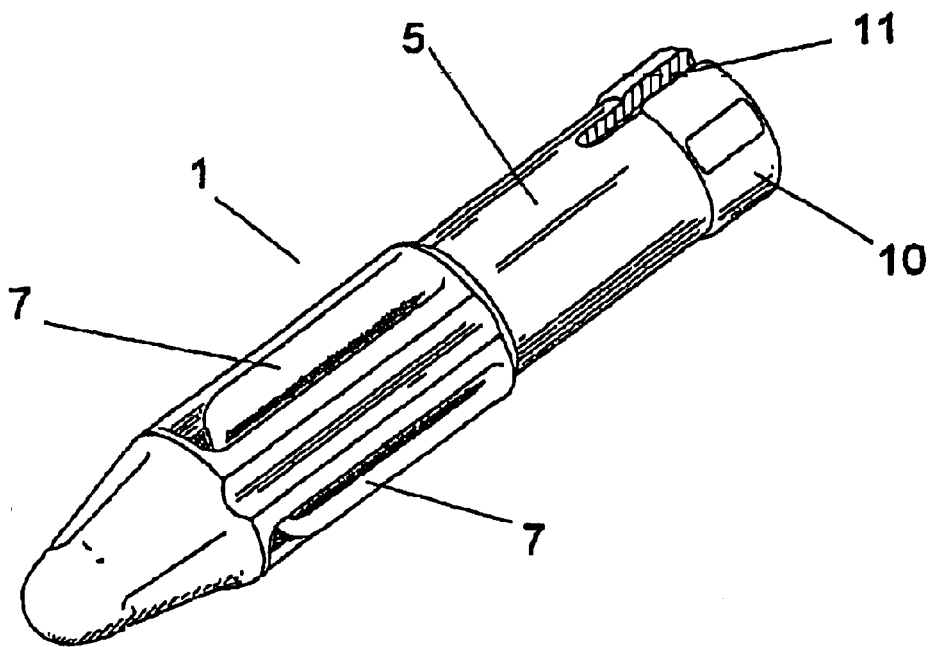
FIG. 4 illustrates a perspective view of an indexing bolt in accordance with the second embodiment of the present invention.
Figure 5:
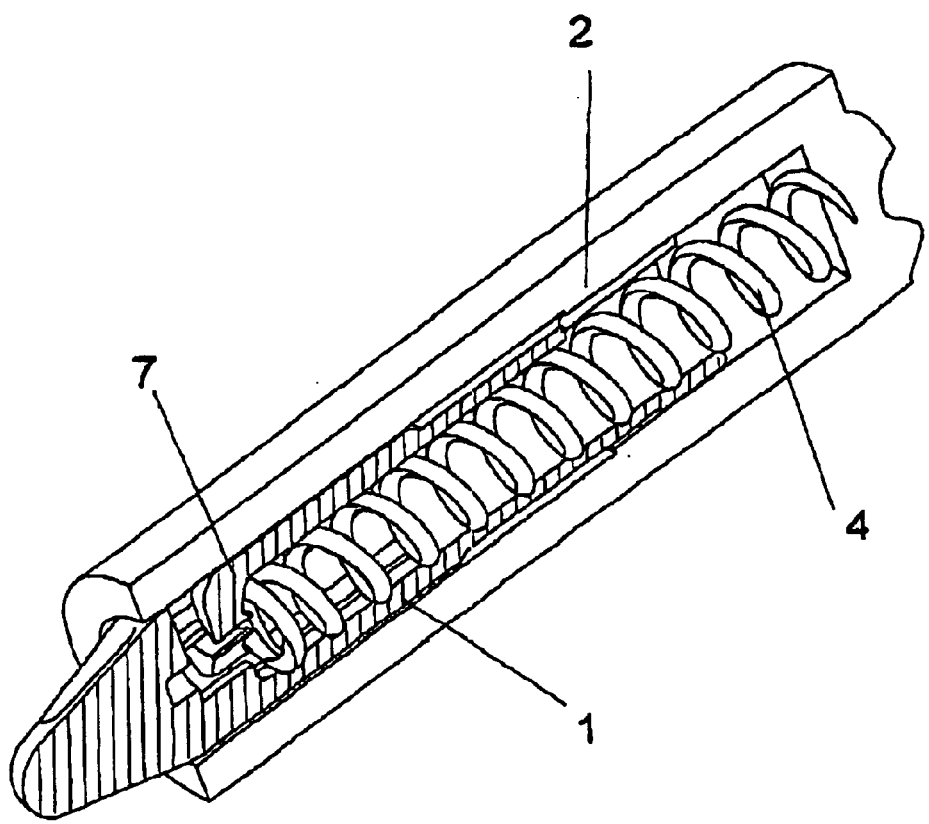
FIG. 5 illustrates a cut-away sectional view of an indexing bolt arrangement having the indexing bolt shown in FIG. 4.
Figure 6:
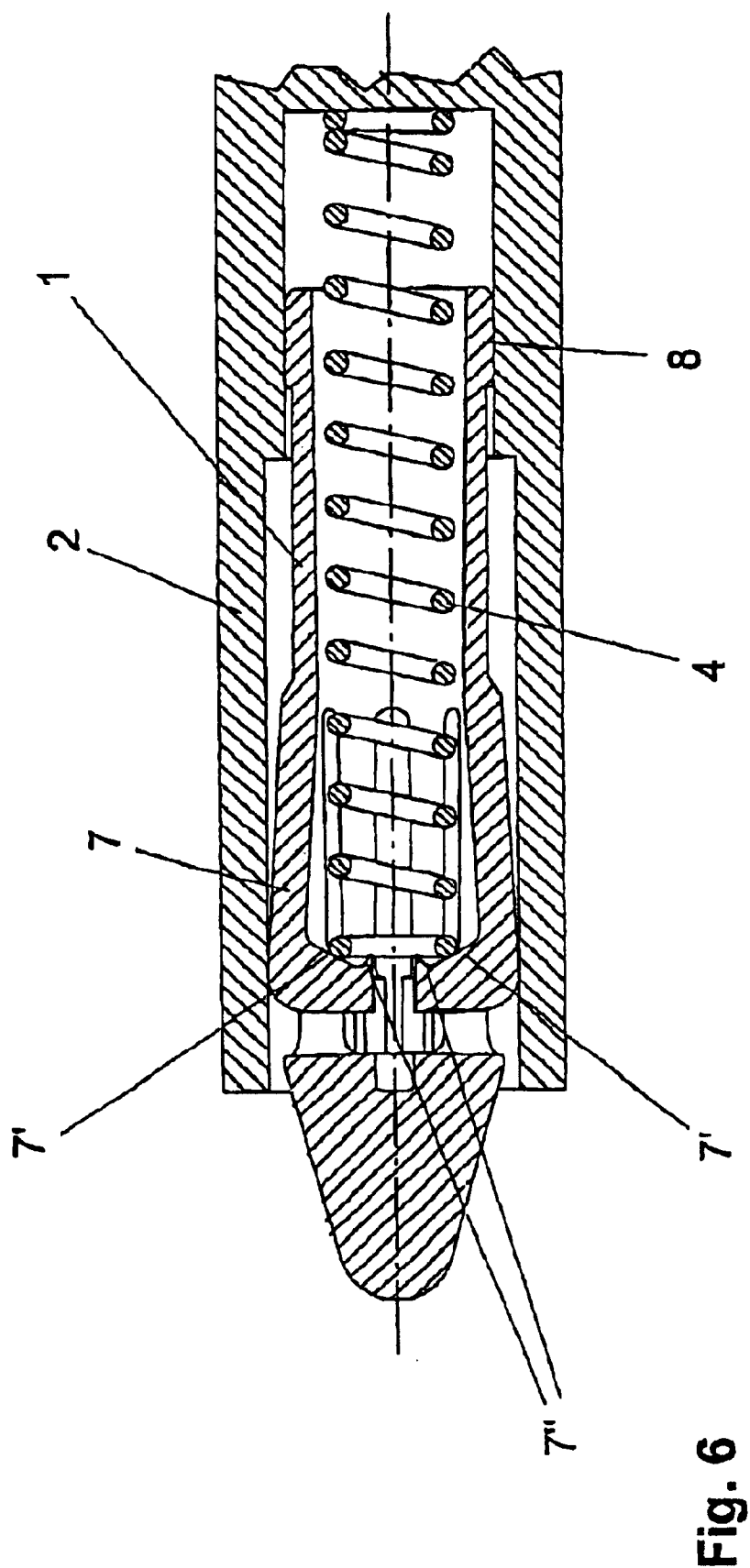
FIG. 6 illustrates a cut-away longitudinal sectional view through an indexing bolt arrangement similar to the arrangement shown in FIG. 5, but having four pressure arms.

The indexing bolt arrangement in accordance with the second embodiment of the present invention is shown in FIGS. 4, 5, and 6. In this arrangement, indexing bolt 1 is also incorporated and guided in hollow cylindrical indexing bolt housing 2. In this case, guiding means 7 are formed by pressure arms 7 extending parallel to indexing bolt 1. Pressure arms 7 are each movably connected with indexing bolt 1 via swivel points.

Deflecting elements such as deflecting bevels 7' are provided at the end of pressure arms 7 near tip 6 against which the one end area of the latching spring 4 rests. Deflecting bevels 7' divert some of the pressure force applied in an axial direction by latching spring 4 into a radial direction. As a result, pressure arms 7 radially spread out and and abut the inner wall of a somewhat wider section of indexing bolt housing 2 under an elastic bias. The radially acting pressure force or resultant frictional force can be set by selecting the angle of incidence for deflecting bevels 7'.

First introducing the end of indexing bolt 1 remote from tip 6 into the somewhat wider area of indexing bolt housing 2 provided with an insertion bevel during assembly greatly simplifies the assembly of indexing bolt 1. In addition, deflecting bevels 7' are provided with catch hooks 7" that limit the maximum possible excursion of pressure arms 7 such that the pressure arms are not damaged during the assembly of indexing bolt 1 by an excessive excursion which can result in material fatigue.

FIGS. 4 and 5 depict an indexing bolt arrangement having three pressure arms 7 offset by an angle of 120°. Of course, more than three pressure arms 7 can be present on indexing bolt 1 depending on the application. FIG. 6 depicts an indexing bolt arrangement having four pressure arms 7 offset by an angle of 90°. Indexing bolt 1 is preferably manufactured as a one-piece plastic injection molded part. Two of the three pressure arms 7 penetrating the surface of indexing bolt 1 are visible through window-like cutouts. Also discernible in FIGS. 4, 5, and 6, are the elastic sections arranged at the end of indexing bolt 1 remote from tip 6, along with one of slots 11.

As indicated above, indexing bolt 1 is incorporated in a hollow cylindrical indexing bolt housing 2. The one flattened end of latching spring 4 here rests on deflecting bevels 7' preferably lying essentially on one plane, while the other flattened end of latching spring 4 is supported against the face of indexing bolt housing 2.

The jacket surface of indexing bolt 1 exhibits a somewhat thinner material thickness behind the swivel points. To facilitate the swiveling motion of pressure arms 7, material can be laced into the swivel point area, thereby producing an articulated joint, e.g., resembling a film hinge. In principle, however, indexing bolt 1 can also be designed in multiple parts, and pressure arms 7 can be joined with indexing bolt 1 by means of an articulated axial joint, for example.

FIG. 6 depicts the interaction between latching spring 4 and deflecting bevels 7'. The flattened end of latching spring 4 abuts deflecting bevels 7' and spreads pressure arms 7 apart. As an alternative, latching spring 4 need not act directly on deflecting bevels 7', but rather, a rigid, separate intermediate ring (not shown) can be arranged between the end of latching spring 4 near tip 6 and deflecting bevel 7', thereby ensuring that the spring pressure is uniformly distributed on pressure arms 7. It is also advantageous to provide an insertion bevel at the end of indexing bolt 1 remote from tip 6 to facilitate assembly.

Indexing bolt 1 in accordance with the present invention is not only beneficial in terms of its manufacture, as it can be manufactured in a single piece as a plastic injection molded part, but can also be used in already existing indexing bolt housings. As a result, previously known indexing bolts can be replaced from existing indexing bolt housings without any problem.

What is claimed is:

1. A switching device comprising:
   a housing having a guide channel;
   an indexing bolt mounted in a longitudinal direction in the guide channel of the housing to move axially through the guide channel, the indexing bolt having a tip at a front end;
   a spring connected between the housing and a rear end of the indexing bolt to axially bias the tip of the indexing bolt against a switch plate; and
   a plurality of guiding means distributed along the periphery of the front end of the indexing bolt, the guiding means radially projecting outward from the indexing bolt to abut the surface of the guide channel of the housing such that the guiding means are radially biased against the surface of the guide channel.

2. The device of claim 1 wherein:
   the guiding means include flexible guiding ribs that are distributed along the periphery of the front end of the indexing bolt in the longitudinal direction, the guiding ribs guiding the front end of the indexing bolt as the indexing bolt moves axially through the guide channel of the housing.

3. The device of claim 2 wherein:
   the guiding ribs are spaced apart at the same angular distance relative to each other.

4. The device of claim 3 wherein:
   the diameter of the indexing bolt with the guiding ribs is slightly oversized relative to the diameter of the guide channel of the housing.

5. The device of claim 2 wherein:
   the guiding ribs abut the surface of the guide channel of the housing to secure the indexing bolt against twisting in the guide channel.

6. The device of claim 5 wherein:
   the housing has guiding projections which radially project from the surface of the guide channel of the housing into the guide channel, wherein pairs of adjoining guiding ribs form V-shaped guiding rib pairs in which the guiding ribs of respective guiding rib pairs rest against opposite sides of respective guiding projections to secure the indexing bolt against twisting in the guide channel.

7. The device of claim 1 wherein:
   the guiding means include movable pressure arms, each of the arms having a deflecting element that interacts with the spring in such a way as to radially press the respective arm against the surface of the guide channel of the housing.

8. The device of claim 7 wherein:
   the arms extend parallel to the longitudinal direction of the indexing bolt, the arms guiding the front end of the indexing bolt as the indexing bolt moves axially through the guide channel of the housing.

9. The device of claim 8 wherein:
   the deflecting element is a deflecting bevel at an end of a respective arm near the front end of the indexing bolt, and an end of the arm remote from the front end of the indexing bolt is movably connected to the indexing bolt.

10. The device of claim 9 wherein:
    the end of the deflecting bevel facing the longitudinal axis of the indexing bolt has a stop hook that limits the radial excursion of the respective arm.

11. The device of claim 9 wherein:
    the angle of incidence for the deflecting bevel is approximately 30°.

12. The device of claim 9 wherein:
    a rigid ring is arranged between the end of the spring near the front end of the indexing bolt to ensure that the axial pressure exerted by the spring is uniformly distributed on the arms.

13. The device of claim 1 wherein:
    the guiding means are spaced apart at the same angular distance relative to each other.

14. The device of claim 1 wherein:
    the indexing bolt is a plastic indexing bolt and the guiding means are plastic guiding means.

15. The device of claim 1 wherein:
    the guiding means form a front guiding section near the front end of the indexing bolt, and the device further comprising a rear guiding section at the rear end of the indexing bolt.

16. The device of claim 15 wherein:
    the rear guiding section includes a bead that envelops the rear end of the indexing bolt.

17. The device of claim 16 wherein:
    the bead is outwardly rounded.

18. The device of claim 16 wherein:
    the rear end of the indexing bolt has a slot, wherein the slot and the bead serve as the rear guiding section.

* * * * *